United States Patent Office 2,991,291
Patented July 4, 1961

2,991,291
3-INDOLYL VINYL KETONES
Jacob Szmuszkovicz, Portage Township, Kalamazoo County, Mich., assignor to The Upjohn Company, Kalamazoo, Mich., a corporation of Delaware
No Drawing. Filed Mar. 17, 1959, Ser. No. 799,864
8 Claims. (Cl. 260—319)

The present invention relates to a novel process for the preparation of organic compounds and is more particularly concerned with a novel process for the preparation of 3-indolyl vinyl ketones and with the products thus produced.

The novel 3-indolyl vinyl ketones of the present invention can be represented by the following general formula:

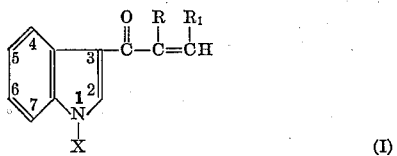

(I)

wherein X represents hydrogen and a lower-alkyl radical containing from 1 to 6 carbon atoms, inclusive, such as methyl, ethyl, propyl, butyl, amyl, hexyl, isopropyl, isobutyl, and the like; R and $R_1$ represent hydrogen and a lower-alkyl radical containing from 1 to 4 carbon atoms, inclusive, such as methyl, ethyl, propyl, butyl, isopropyl, isobutyl, and the like.

The 4-, 5-, 6-, and 7-positions of the benzene ring can include such substituents as hydrogen; halogen, e.g., chlorine, bromine, fluorine, and the like; a benzyloxy radical containing 7 to 13 carbon atoms, inclusive, e.g., benzyloxy, benzhydryloxy, para-methylbenzyloxy, m-chlorobenzyloxy, p-ethoxybenzyloxy, and the like; a lower-alkoxy radical containing from 1 to 8 carbon atoms, inclusive, e.g., methoxy, ethoxy, butoxy, octyloxy, and the like. The 4-, 5-, 6-, and 7-position substituents can be alike or different but it is understood that hydrogen is located in the positions not occupied by other substituents. The 2-position can be occupied by hydrogen; a lower-alkyl radical containing from 1 to 8 carbon atoms, inclusive, e.g., methyl, ethyl, propyl, octyl, and the like; an aralkyl radical containing 7 to 13 carbon atoms, inclusive, e.g., benzyl, phenethyl, benzhydryl, and the like; an aryl radical containing 6 to 10 carbon atoms, inclusive, e.g., phenyl, tolyl, naphthyl, and the like.

According to the process of the present invention the novel 3-indolyl vinyl ketones are prepared by reacting in an aqueous medium a 3-indolyl 2-aminoethyl ketone quaternary ammonium or acid addition salt with an alkali-metal salt.

The 3-indolyl 2-aminoethyl ketone free bases utilized in preparing the starting quaternary ammonium and acid addition salts can be represented by the following general formula:

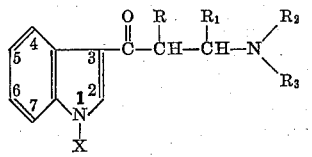

wherein X, R, and $R_1$ have the values noted above, and $R_2$ and $R_3$ taken individually represent aryl, aralkyl, alkyl and cycloalkyl and together contain not more than 16 carbon atoms, and $R_2$ and $R_3$ taken together with can also represent a heterocyclic amino radical containing 4 to 6 carbon atoms. Representative

radicals include, e.g., dimethylamino, diethylamino, dipropylamino, dibutylamino, dihexylamino, methylethylamino, ethylpropylamino, propylcyclohexylamino, diphenylamino, dibenzylamino, diphenethylamino, dicyclohexylamino, morpholinyl, piperidyl, 2-methylpiperidyl, pyrrolidyl, 2,2-dimethylpyrrolidyl, thiamorpholinyl, hexamethyleneimino, and the like.

The 3-indolyl 2-aminoethyl ketones can be prepared in the manner more fully described in copending application Serial No. 770,275, filed October 29, 1958. For example, the 1-alkyl-3-indolyl 2-aminoethyl ketones can be prepared by reacting a 1-alkyl-3-acylindole having a hydrogen atom alpha to the carbonyl group with an aliphatic aldehyde and a secondary amine in the presence of an inert solvent. It is preferred to employ equimolar quantities of reactants although other quantities can also be employed, if desired. The reaction is generally carried out under acid conditions, i.e., a pH of less than seven. Various aliphatic aldehydes can be employed, e.g., aqueous formaldehyde, paraformaldehyde, acetaldehyde, butyraldehyde, isobutyraldehyde, valeraldehyde, and the like. Inert solvents can include methanol, ethanol, and isoamyl alcohol although when aqueous formaldehyde is employed no additional solvent is necessary. Various secondary amines can be employed in the reaction such as the secondary alkyl, cycloalkyl, aralkyl, and aryl amines, as well as heterocyclic amines. Representative amines include dimethylamine, diethylamine, methylethylamine, diisopropylamine, dibenzylamine, diphenethylamine, dicyclohexylamine, piperidine, thiamorpholine, pyrrolidine, morpholine, and the like.

The acid conditions generally necessary for completion of the reaction can be brought about by adding the amine as an acid addition salt such as the hydrochloride, sulfate, hydrobromide, and the like. The acid conditions can also be brought about by the addition of an acid such as acetic, hydrochloric, phosphoric, sulfuric, hydrobromic, and the like, to the reaction mixture.

The reaction is carried out at a temperature between about fifty and about 100 degrees centigrade, advantageously at a temperature between about 65 and about 85 degrees centigrade.

The 1-unsubstituted-3-indolyl 2-aminoethyl ketones can be prepared by reacting a 1-unsubstituted-3-acylindole with an aliphatic aldehyde and a secondary amine and then subjecting the resulting 1-aminomethyl-3-indolyl 2-aminoethyl ketone to alkaline hydrolysis utilizing, for example, potassium carbonate, sodium hydroxide, and the like. The alkaline hydrolysis results in a cleavage of the 1-aminomethyl substituent to produce a 1-unsubstituted-3-indolyl 2-aminoethyl ketone. In preparing the 1-aminomethyl-3-indolyl 2-aminoethyl ketones it is generally preferable to employ at least twice the molar amount of aliphatic aldehyde and secondary amine based on the starting 1-unsubstituted-3-acylindole. Otherwise the reaction conditions are substantially the same as noted above in the preparation of the 1-alkyl-3-indolyl 2-aminoethyl ketones.

The thus-produced 3-indolyl 2-aminoethyl ketones, i.e., 1-alkyl-3-indolyl 2-aminoethyl ketones and 1-unsubstituted-3-indolyl 2-aminoethyl ketones, can be recovered in a conventional manner from the reaction mixture. For example, the 3-indolyl 2-aminoethyl ketone acid addition salt precipitate can be recovered by filtration after cooling the reaction mixture. In some instances the acid addition salt is extremely soluble and will not readily precipitate upon cooling from the reaction mixture. In such cases, however, the 3-indolyl 2-aminoethyl ketone free base can be initially recovered by evaporating the reaction mixture, adding water to the residue, extracting the mixture with ether, adding a cold solution of an alkali-metal hydroxide to the aqueous solution, extracting with chloroform, drying the chloroform extract over sodium sulfate, and evaporating the chloroform solution. The acid addition salt can be prepared by adding the desired acid (e.g., hydrochloric, hyrobromic, sulfuric, acetic, tartaric, citric, and the like) to the dried chloroform solution of the free base.

The free base can be converted to the quaternary ammonium salts by reacting the tertiary amine free base in an inert solvent (e.g., acetone, methanol, and the like) with a suitable quaternary ammonium salt-forming compound such as methyl iodide, ethyl bromide, octyl bromide, benzyl chloride, dimethyl sulfate, and the like.

The 3-acylindoles utilized in the preparation of the 3-indolyl 2-aminoethyl ketones can be prepared by the processes outlined in "Heterocyclic Compounds," Elderfield, volume 3, page 44, 1952—John Wiley and Sons, Inc. For example, 3-indolyl methyl ketone can be prepared by reacting acetyl chloride with 3-indolylmagnesium iodide; 2-methyl-3-indolyl methyl ketone can be prepared by reacting 2-methylindole with acetic anhydride and sodium acetate.

1-alkyl-3-acylindoles can be prepared by utilizing the procedure of Baker, J. Chem. Soc. 1940, 458–60. For example, 1-alkyl-3-acylindoles can be prepared by reacting a 1-unsubstituted-3-acylindole with an alkyl halide in the presence of an alkali-metal alkoxide.

The various 2-, 4-, 5-, 6-, and 7-substituted indoles which can be employed as starting compounds for the preparation of the 3-acylindoles can be prepared by utilizing the procedures outlined in U.S. Patent 2,825,734.

In carrying out the process of the present invention a 3-indolyl 2-aminoethyl ketone quaternary ammonium or acid addition salt is reacted with an alkali-metal salt in an aqueous medium at a temperature between about 50 and about 95° C., preferably between about 60 and about 90° C. Alkali-metal salts which can be employed include the carbonates, bicarbonates, thiocyanates, and alkanoates having up to 9 carbon atoms, the bicarbonates ordinarily being preferred. Salts which can be employed include sodium carbonate, sodium bicarbonate, potassium bicarbonate, lithium carbonate, lithium bicarbonate, sodium thiocyanate, potassium thiocyanate, potassium acetate, sodium acetate, sodium propionate, potassium valerate, potassium carproate, sodium caprylate, and the like. The quantity of alkali-metal salts which can be employed in the reaction should be sufficient to neutralize the released acid and preferably at least a stoichiometric quantity of the alkali-metal salt is employed. For example, when employing 3-indolyl 2-dimethylaminoethyl ketone methiodide as starting material, the stoichiometric amounts of sodium bicarbonate and sodium carbonate are one molar and one-half molar, respectively, based on each molar amount of 3-indolyl 2-dimethylaminoethyl ketone methiodide.

Less than stoichiometric quantities of alkali-metal salt can be employed although this is not preferred. In those instances wherein a salt is employed which in aqueous solution is not strongly alkaline, e.g., sodium bicarbonate, then quantities greater than stoichiometric can be employed to good advantages, particularly for increasing reaction rate. However, salts which in aqueous solution are strongly alkaline, e.g., sodium carbonate, should not be employed in quantities substantially greater than stoichiometric in order to minimize undesirable side reactions.

The resulting 3-indolyl vinyl ketones can be separated from the reaction mixture, e.g., by filtration, and purified by conventional techniques such as recrystallization from an organic solvent or by sublimation, etc.

The compounds of the present invention have demonstrated antifungal activity and, more particularly, are active against *Trichophyton rubrum* and *Trichophyton violaceum*. For example, in an aqueous dispersion these compounds can be effectively employed in washing public bath room floors and, more particularly, floor areas immediately adjacent to public swimming pools.

The following examples are illustrative of the process and products of the present invention, but are to be construed as limiting.

EXAMPLE 1

*3-indolyl vinyl ketone*

A. 3-INDOLYL 2-DIMETHYLAMINOETHYL KETONE FREE BASE

A mixture of 3-indolyl methyl ketone (15.9 g.; 0.1 mole) (Saxton, J. Chem. Soc. 1952, 3592), dimethylamine hydrochloride (8.15 g.; 0.1 mole), paraformaldehyde (4.5 g.; 0.15 mole) and 150 ml. of absolute ethanol was refluxed for 24 hours. The clear brown solution was allowed to stand at 25° C. for 24 hours and was then evaporated under vacuum to a viscous oil. Water (200 ml.) was added and the mixture was filtered. The aqueous filtrate was extracted twice with ether. The clear aqueous solution was then cooled in ice and made alkaline with a cold solution of potassium hydroxide (10 g.) in 25 ml. of water. The resulting oil was extracted thrice with chloroform and the chloroform extracts were washed twice with saturated sodium chloride solution, and dried over anhydrous sodium sulfate. The chloroform was removed by evaporation to produce 13.1 g. of 3-indolyl 2-dimethylaminoethyl ketone free base. The compound melted at 116–118.5° C.

B. 3-INDOLYL 2-DIMETHYLAMINOETHYL KETONE HYDROCHLORIDE

To a chloroform solution of 3-indolyl 2-dimethylaminoethyl ketone free base was added gaseous hydrogen chloride and the resulting precipitate, 3-indolyl 2-dimethylaminoethyl ketone hydrochloride, melted at 179–180° C.

C. 3-INDOLYL 2-DIMETHYLAMINOETHYL KETONE METHIODIDE

Methyl iodide (1.42 g.; 0.01 mole) was added to a solution of 1.08 g. of 3-indolyl 2-dimethylaminoethyl ketone free base in 6 ml. of methanol cooled in ice. The mixture was allowed to stand in the cold for four hours. The mixture was filtered and the precipitate washed with cold methanol to produce 1.53 g. of 3-indolyl 2-dimethylaminoethyl ketone methiodide which melted at 205.5–207.5° C.

D. 3-INDOLYL VINYL KETONE

To a solution of 10.2 g. of sodium bicarbonate in 300 ml. of distilled water was added 9.3 g. of 3-indolyl 2-dimethylaminoethyl ketone methiodide. The mixture was stirred and heated on the steam bath while the internal temperature was raised from 60 to 89° C. in approximately 9 minutes. The reaction mixture was then cooled in ice for 3 hours and the resulting solid was recovered by filtration and washed with a minimum of cold water. The solid was boiled with 50 ml. of acetone and insoluble starting material (3 g.) was removed by filtration. The filtrate was evaporated to a small volume, 150 ml. of benzene was added, and 20 ml. of solvent was distilled to remove residual acetone. The remaining solution was filtered to remove 0.1 g. of starting material, evaporated until crystallization commenced, and then allowed to stand at 25° C. for a short period. The solid which separated was isolated by filtration, washed with benzene and dried; weight, 2.5 g. A second crop was isolated by evaporation of the filtrate and precipitation with petroleum ether (boiling range 30–60° C.); dry weight, 0.2 g. There was thus obtained a total of 2.7 g. of 3-indolyl vinyl ketone which had a melting point of 153–156° C. A portion of this product was sublimed at 140–142° C. and at a pressure of 0.1 mm. of mercury. The resulting analytical sample consisted of colorless prisms having a melting point of 157–159° C. The ultraviolet absorption spectrum showed maxima at 258 mu, 269.5 mu, 274.5 mu and 324 mu.

*Anal.*—Calcd. for $C_{11}H_9NO$: C, 77.17; H, 5.30; N, 8.18. Found: C, 77.33; H, 5.28; N, 8.54.

EXAMPLE 2

*5-benzylol-3-indolyl vinyl ketone*

A. 5-BENZYLOXY-3-INDOLYL METHYL KETONE 5-benzyloxyindole (11.15 g.; 0.05 mole) dissolved in 100 ml. of ether and 100 ml. of benzene was added during five minutes to a Grignard reagent prepared from magnesium (2.68 g.; 0.11 mole) and methyl iodide (17 g.; 0.12 mole). The mixture was refluxed for 75 minutes. It was then cooled in ice and 8.65 g. (0.11 mole) of acetyl chloride in 25 ml. of ether was added dropwise. The resulting mixture was stirred for three hours at about 25° C. The mixture was then cooled in ice and acidified with a solution of 15 ml. of acetic acid in 50 ml. of water. After stirring for 15 minutes the precipitate was filtered, washed with water and ether, and suspended in 50 ml. of ethanol. A solution of 3 g. of potassium hydroxide in 10 ml. of water was added and the resulting solution was evaporated to about half its volume to yield 5.95 g. of 5-benzyloxy-3-indolyl methyl ketone which was recrystallized from ethanol and melted at 188–190° C.

B. 5-BENZYLOXY-3-INDOLYL 2-DIMETHYLAMINO-ETHYL KETONE HYDROCHLORIDE

A mixture of 2.65 g. of 5-benzyloxy-3-indolyl methyl ketone (0.01 mole), 0.98 g. of dimethylamine hydrochloride (0.012 mole), 0.6 g. of paraformaldehyde and 25 ml. of absolute ethanol was refluxed for 26 hours. Crystals appeared after a few hours of refluxing. The mixture was allowed to stand for 12 hours and was then cooled in ice, filtered, and washed with cold methanol and ether to yield 2.48 g. of 5-benzyloxy-3-indolyl 2-dimethylaminoethyl ketone hydrochloride. The hydrochloride was recrystallized twice by dissolving in 75 ml. of absolute ethanol and evaporating to 40 ml. The recrystallized hydrochloride melted at 199.5–200.5° C.

C. 5-BENZYLOXY-3-INDOLYL VINYL KETONE

In the same manner as shown in Example 1, part D, 5-benzyloxy-3-indolyl vinyl ketone was prepared by substituting 5-benzyloxy-3-indolyl 2-dimethylaminoethyl ketone hydrochloride and sodium carbonate for 3-indolyl 2-dimethylaminoethyl ketone methiodide and sodium bicarbonate.

EXAMPLE 3

*3-indolyl 1-methylvinyl ketone*

A. 1-DIMETHYLAMINOMETHYL-3-INDOLYL 1-METHYL-2-DIMETHYLAMINOETHYL KETONE FREE BASE 3-propionylindole was prepared in the same manner disclosed in Example 2, part A, by substituting indole and propionyl chloride for 5-benzyloxyindole and acetyl chloride.

A mixture of 3.46 g. of 3-propionylindole (0.02 mole), 8.16 g. of dimethylamine hydrochloride (0.1 mole), 4.5 g. of paraformaldehyde (0.15 mole), and 70 ml. of absolute ethanol was refluxed for 28 hours. The mixture was evaporated to about 15 ml. and water was added which resulted in a precipitate consisting essentially of unchanged 3-propionylindole. The mixture was filtered and the filtrate was extracted twice with chloroform. The aqueous layer was made basic with 10% aqueous potassium hydroxide solution and extracted with chloroform. The chloroform extracts were washed with saturated sodium chloride solution, dried over anhydrous sodium sulfate and evaporated to give 1.5 g. of 1-dimethylaminomethyl-3-indolyl 1-methyl-2-dimethylaminoethyl ketone free base as a yellow oil.

B. 3-INDOLYL 1-METHYL-2-DIMETHYLAMINOETHYL KETONE FREE BASE

A solution of 1.95 g. of potassium hydroxide in 5 ml. of water was added to a solution of 1-dimethylaminomethyl-3-indolyl 1-methyl-2-dimethylaminoethyl ketone free base in 12.5 ml. of methanol and the resulting solution was refluxed for one-half hour. The mixture was evaporated on the steam bath under vacuum and 20 ml. of water was then added. The resulting mixture was extracted three times with a total of 50 ml. of chloroform. The chloroform extracts were washed once with water and then three times with 10% hydrochloric acid (20, 10 and 10 ml. portions). The combined acid extracts were washed once with 10 ml. of chloroform and then poured into an ice-cold solution of 20 ml. of 25% aqueous potassium hydroxide solution. The resulting mixture was extracted three times with ether (total 150 ml.). The combined ethereal extracts were washed once with water, once with saturated sodium chloride solution, dried over anhydrous sodium sulfate and evaporated to give 0.543 g. of a yellow glassy solid. The product was recrystallized from a mixture of 3 ml. of ethyl acetate and 9 ml. of petroleum ether; 0.265 g. of 3-indolyl 1-methyl-2-dimethylaminoethyl ketone free base was thus obtained. The compound melted at 101–102° C.

C. 3-INDOLYL 1-METHYL-2-DIMETHYLAMINOETHYL KETONE METHOBROMIDE

In the same manner as shown in Example 1, part C, 3-indolyl 1-methyl-2-dimethylaminoethyl ketone methobromide was prepared by substituting 3-indolyl 1-methyl-2-dimethylaminoethyl ketone free base and methyl bromide for 3-indolyl 2-dimethylaminoethyl ketone free base and methyl iodide.

D. 3-INDOLYL 1-METHYLVINYL KETONE

In the same manner as shown in Example 1, part D, 3-indolyl 1-methylvinyl ketone was prepared by substituting 3-indolyl 1-methyl-2-dimethylaminoethyl ketone methobromide and potassium carbonate for 3-indolyl 2-dimethylaminoethyl ketone methiodide and sodium bicarbonate.

EXAMPLE 4

*3-indolyl vinyl ketone*

A. 3-INDOLYL 2-DIBENZYLAMINOETHYL KETONE HYDROCHLORIDE

A mixture of 4.35 g. of 3-indolyl methyl ketone, 6.4 g. of dibenzylamine hydrochloride, 1.23 g. of paraformaldehyde and 41 ml. of absolute ethanol was refluxed for 24 hours. The solution was cooled to about 25° C. and crystallization thereupon occurred. The cooled mixture was filtered and the precipitate was washed with methanol and ether to yield 3-indolyl 2-dibenzylaminoethyl ketone hydrochloride which melted at 189–189.5° C.

B. 3-INDOLYL VINYL KETONE

In the same manner as shown in Example 1, part D, 3-indolyl vinyl ketone was prepared by substituting 3-indolyl 2-dibenzylaminoethyl ketone hydrochloride and sodium acetate for 3-indolyl 2-dimethylaminoethyl ketone methiodide and sodium bicarbonate.

EXAMPLE 5

*1-methyl-3-indolyl vinyl ketone*

A. 1-METHYL-3-INDOLYL 2-DIMETHYLAMINOETHYL KETONE HYDROCHLORIDE

A mixture of 13.6 g. of 1-methyl-3-acetylindole [C.A. 49, 1006$^d$ (1955)], 6.4 g. of dimethylamine hydrochloride, 3.54 g. of paraformaldehyde, and 120 ml. of ethanol was refluxed for 24 hours. The solution was evaporated under vacuum and the resulting crude solid was recrystallized twice from methanol to yield 1-methyl-3-indolyl 2-dimethylaminoethyl ketone hydrochloride which melted at 185–186° C.

B. 1-METHYL-3-INDOLYL VINYL KETONE

In the same manner as shown in Example 1, part D, 1-methyl-3-indolyl vinyl ketone was prepared by substituting 1-methyl-3-indolyl 2-dimethylaminoethyl ketone hydrochloride and lithium bicarbonate for 3-indolyl 2-dimethylaminoethyl ketone methiodide and sodium bicarbonate.

EXAMPLE 6

*3-indolyl 1-ethylvinyl ketone*

A. 1-DIMETHYLAMINOMETHYL-3-INDOLYL 1-ETHYL-2-DIMETHYLAMINOETHYL KETONE FREE BASE

A mixture of 6.77 g. (0.0362 mole) of 3-butyrylindole (Oddo et al., Beilstein 21,303), 14.8 g. (0.181 mole) of dimethylamine hydrochloride, 8.2 g. (0.273 mole) of paraformaldehyde and 135 ml. of absolute ethanol was refluxed for 26 hours. The resulting yellow solution was evaporated on the steam bath and 60 ml. of water was added. The mixture was then filtered and the filtrate was extracted with three 50 ml. portions of ether, the remaining filtrate was cooled in ice, and then made basic with a solution of potassium carbonate (19 g. in 39 ml. of water). The mixture was extracted three times with 60 ml. portions of ether. The combined ether extracts were washed with water and then with saturated sodium chloride solution, dried over anhydrous sodium sulfate, and evaporated under vacuum to produce 2.94 g. of yellow oil which solidified after 12 hours. The product was recrystallized from isopropyl ether to produce 0.33 g. of 1-dimethylaminomethyl-3-indolyl 1-ethyl - 2 - dimethylaminoethyl ketone free base which melted at 78–80° C.

B. 3-INDOLYL 1-ETHYL-2-DIMETHYLAMINOETHYL KETONE FREE BASE

In the same manner as shown in Example 3, part B, 3-indolyl 1-ethyl-2-dimethylaminoethyl ketone free base was prepared by hydrolyzing 1-dimethylaminomethyl-3-indolyl 1-ethyl-2-dimethylaminoethyl ketone free base in lieu of 1-dimethylaminomethyl-3-indolyl 1-methyl-2-dimethylaminoethyl ketone free base.

C. 3-INDOLYL 1-ETHYL-2-DIMETHYLAMINOETHYL KETONE PROPYL IODIDE

In the same manner as shown in Example 1, part C, 3-indolyl 1-ethyl-2-dimethylaminoethyl ketone propyl iodide was prepared by substituting 3-indolyl 1-ethyl-2-dimethylaminoethyl ketone free base and propyl iodide for 3-indolyl 2-dimethylaminoethyl ketone free base and methyl iodide.

D. 3-INDOLYL 1-ETHYLVINYL KETONE

In the same manner as shown in Example 1, part D, 3-indolyl 1-ethylvinyl ketone was prepared by using 3-indolyl 1-ethyl-2-dimethylaminoethyl ketone propyl iodide and sodium thiocyanate in lieu of 3-indolyl 2-dimethylaminoethyl ketone methiodide and sodium bicarbonate.

EXAMPLE 7

*1-ethyl-3-indolyl vinyl ketone*

A. 1-ETHYL-3-INDOLYL 2-DIMETHYLAMINOETHYL KETONE FREE BASE

A mixture of 49.32 g. of 1-ethyl-3-acetylindole (0.264 mole), 25.8 g. of dimethylamine hydrochloride (0.316 mole), and 15.85 g. of paraformaldehyde (0.528 mole) in 400 ml. of absolute ethanol was refluxed for 19 hours. The resulting solution was evaporated to dryness on the steam bath under vacuum. The residue was dissolved in 350 ml. of water and extracted twice with ether. The brown aqueous solution was cooled in ice and made basic with a solution of potassium hydroxide (33.6 g. in 110 ml. of water). The mixture was extracted three times with ether. The combined ethereal extracts were washed with saturated sodium chloride solution, dried over anhydrous sodium sulfate and evaporated to give 56 g. of 1-ethyl-3-indolyl 2-dimethylaminoethyl ketone free base.

B. 1-ETHYL-3-INDOLYL 2-DIMETHYLAMINOETHYL KETONE METHIODIDE

Fifteen grams of 1-ethyl-3-indolyl 2-dimethylaminoethyl ketone free base was dissolved in 65 ml. of methanol. The mixture was cooled in ice and 17.5 g. of methyl iodide was added. The mixture was kept in ice for one-half hour and then at 25° C. for 40 minutes. The crystals were filtered, washed with methanol and then with ether. The yield of 1-ethyl-3-indolyl 2-dimethylaminoethyl ketone methiodide was 20.6 g. and the compound melted at 192–194° C.

C. 1-ETHYL-3-INDOLYL VINYL KETONE

In the same manner as shown in Example 1, part D, 1-ethyl-3-indolyl vinyl ketone was prepared by substituting 1-ethyl-3-indolyl 2-dimethylaminoethyl ketone methiodide and potassium propionate for 3-indolyl 2-dimethylaminoethyl ketone methiodide and sodium bicarbonate.

EXAMPLE 8

*1-methyl-3-indolyl 1-methylvinyl ketone*

A. 1-METHYL-3-PROPIONYLINDOLE

A suspension of 51 g. of 3-propionylindole (0.295 mole) in 530 ml. of water and 52 g. of sodium hydroxide was heated to 70° C. on the steam bath. Heating was discontinued and 56 ml. of dimethyl sulfate was added during five minutes. Addition of dimethyl sulfate and sodium hydroxide was repeated two more times and the mixture was then heated at 95° C. for 2.5 hours. The oily layer solidified after 12 hours. The solid was recovered by filtration and washed with water. The product was dissolved in 800 ml. of ether, filtered from a brown impurity, and evaporated until crystallization started. The product, 1-methyl-3-propionylindole, weighed 40.15 g. and melted at 80–81.5° C.

B. 1-METHYL-3-INDOLYL 1-METHYL-2-DIMETHYLAMINOETHYL KETONE FREE BASE

A mixture of 9.35 g. of 1-methyl-3-propionylindole (0.05 mole), 20.4 g. of dimethylamine hydrochloride (0.25 mole), 11.3 g. of paraformaldehyde (0.375 mole) and 175 ml. of absolute ethanol was refluxed for 21 hours. The mixture was evaporated to dryness and the resulting oily solid was treated with 100 ml. of water, filtered, and washed with water. The aqueous filtrate was extracted twice with 100 ml. portions of ether and was then cooled in ice and made basic with a solution of 17 g. of potassium hydroxide in 50 ml. of water. The resulting mixture was extracted three times with 350 ml. of ether. The combined extracts were washed once with water, once with saturated sodium chloride solution, dried over anhydrous sodium sulfate and evaporated to give 4.0 g. of an oil which solidified on standing. The product, 1-methyl-3-indolyl 1-methyl-2-dimethylaminoethyl ketone free base, was recrystallized from Skellysolve B (mixture of hexanes) and melted at 79.5–80.5° C.

C. 1-METHYL-3-INDOLYL 1-METHYL-2-DIMETHYLAMINOETHYL KETONE SULFATE

In the same manner as shown in Example 1, part B, 1-methyl-3-indolyl 1-methyl-2-dimethylaminoethyl ketone sulfate was prepared by substituting 1-methyl-3-indolyl 1-methyl-2-dimethylaminoethyl ketone free base and sulfuric acid for 3-indolyl 2-dimethylaminoethyl ketone free base and hydrogen chloride.

D. 1-METHYL-3-INDOLYL 1-METHYLVINYL KETONE

In the same manner as shown in Example 1, part D, 1-methyl-3-indolyl 1-methylvinyl ketone was prepared by substituting 1-methyl-3-indolyl 1-methyl-2-dimethylamino-

EXAMPLE 9

*1,2-diethyl-3-indolyl 2-ethylvinyl ketone*

A. 1,2-DIETHYL-3-ACETYLINDOLE

In the same manner as shown in Example 2, part A, 2-ethyl-3-acetylindole was prepared utilizing 2-ethyl-indole (J. Chem. Soc. 1948, 272) in lieu of 5-benzyloxyindole. The resulting 2-ethyl-3-acetylindole was reacted with ethyl iodide in the manner disclosed by Baker, supra, to produce 1,2-diethyl-3-acetylindole.

B. 1,2-DIETHYL-3-INDOLYL 2-ETHYL-2-DIETHYL-AMINOETHYL KETONE HYDROCHLORIDE

In the same manner as shown in Example 5, part A, 1,2-diethyl-3-indolyl 2-ethyl-2-diethylaminoethyl ketone hydrochloride was prepared using 1,2-diethyl-3-acetylindole, diethylamine hydrochloride, and propionaldehyde in lieu of 1-methyl-3-acetylindole, dimethylamine hydrochloride and paraformaldehyde.

C. 1,2-DIETHYL-3-INDOLYL 2-ETHYLVINYL KETONE

In the same manner as shown in Example 1, part D, 1,2-diethyl-3-indolyl 2-ethylvinyl ketone was prepared by substituting 1,2-diethyl-3-indolyl 2-ethyl-2-diethylaminoethyl ketone hydrochloride and potassium carbonate for 3-indolyl 2-dimethylaminoethyl ketone methiodide and sodium bicarbonate.

EXAMPLE 10

*7-methoxy-3-indolyl 1,2-dipropylvinyl ketone*

A. 7-METHOXY-3-VALERYLINDOLE

In the same manner as shown in Example 2, part A, 7-methoxy-3-valerylindole was prepared utilizing 7-methoxy-indole (C.A. 44, 604c) and valeryl chloride in lieu of 5-benzyloxyindole and acetyl chloride.

B. 1-(1-DIBUTYLAMINOBUTYL)-7-METHOXY-3-INDOLYL 1,2-DIPROPYL-2-DIBUTYLAMINOETHYL KETONE FREE BASE

In the same manner as shown in Example 3, part A, 1-(1-dibutylaminobutyl)-7-methoxy-3-indolyl 1,2-dipropyl-2-dibutylaminoethyl ketone free base was prepared using 7-methoxy-3-valerylindole, dibutylamine hydrochloride, and butyraldehyde in lieu of 3-propionylindole, dimethylamine hydrochloride, and paraformaldehyde.

C. 7-METHOXY-3-INDOLYL 1,2-DIPROPYL-2-DIBUTYL-AMINOETHYL KETONE FREE BASE

In the same manner as shown in Example 3, part B, 7-methoxy-3-indolyl 1,2-dipropyl-2-dibutylaminoethyl ketone free base was prepared by hydrolyzing 1-(1-dibutyl-aminobutyl)-7-methoxy-3-indolyl 1,2-dipropyl-2-dibutylaminoethyl ketone free base in lieu of 1-dimethylaminomethyl-3-indolyl 1-methyl-2-dimethylaminoethyl ketone free base.

D. 7-METHOXY-3-INDOLYL 1,2-DIPROPYL-2-DIBUTYL-AMINOETHYL KETONE ETHOBROMIDE

In the same manner as shown in Example 1, part C, 7-methoxy-3-indolyl 1,2-dipropyl-2-dibutylaminoethyl ketone ethobromide was prepared by substituting 7-methoxy-3-indolyl 1,2-dipropyl-2-dibutylaminoethyl ketone free base and ethyl bromide for 3-indolyl 2-dimethylaminoethyl ketone free base and methyl iodide.

E. 7-METHOXY-3-INDOLYL 1,2-DIPROPYLVINYL KETONE

In the same manner as shown in Example 1, part D, 7-methoxy-3-indolyl 1,2-dipropylvinyl ketone was prepared by substituting 7-methoxy-3-indolyl 1,2-dipropyl-2-dibutylaminoethyl ketone ethobromide and sodium butyrate for 3-indolyl 2-dimethylaminoethyl ketone methiodide and sodium bicarbonate.

EXAMPLE 11

*2-phenyl-5-chloro-3-indolyl 1-methylvinyl ketone*

A. 2-PHENYL-5-CHLORO-3-PROPIONYLINDOLE

In the same manner as shown in Example 2, part A, 2-phenyl-5-chloro-3-propionylindole was prepared using 2-phenyl-5-chloroindole (J. Chem. Soc. 1948, 847) and propionyl chloride in lieu of 5-benzyloxyindole and acetyl chloride.

B. 1-DIPROPYLAMINOMETHYL-2-PHENYL-5-CHLORO-3-INDOLYL 1-METHYL-2-DIPROPYLAMINOETHYL KETONE FREE BASE

In the same manner as shown in Example 3, part A, 1-dipropylaminomethyl-2-phenyl-5-chloro-3-indolyl 1-methyl-2-dipropylaminoethyl ketone free base was prepared using 2-phenyl-5-chloro-3-propionylindole and dipropylamine hydrochloride in lieu of 3-propionylindole and dimethylamine hydrochloride.

C. 2-PHENYL-5-CHLORO-3-INDOLYL 1-METHYL-2-DIPROPYLAMINOETHYL KETONE FREE BASE

In the same manner as shown in Example 3, part B, 2-phenyl-5-choloro-3-indolyl 1-methyl-2-dipropylaminoethyl ketone free base was prepared by hydrolyzing 1-dipropylaminomethyl-2-phenyl-5-chloro-3-indolyl 1-methyl-2-dipropylaminoethyl ketone free base in lieu of 1-dimethylaminomethyl-3-indolyl 1-methyl-2-dimethylaminoethyl ketone free base.

D. 2-PHENYL-5-CHLORO-3-INDOLYL 1-METHYL-2-DIPROPYLAMINOETHYL KETONE PROPYL IODIDE

In the same manner as shown in Example 1, part C, 2-phenyl-5-chloro-3-indolyl 1-methyl-2-dipropylaminoethyl ketone propyl iodide was prepared by substituting 2-phenyl-5-chloro-3-indolyl 1-methyl-2-dipropylaminoethyl ketone free base and propyl iodide for 3-indolyl 2-dimethylaminoethyl ketone free base and methyl iodide.

E. 2-PHENYL-5-CHLORO-3-INDOLYL 1-METHYLVINYL KETONE

In the same manner as shown in Example 1, part D, 2-phenyl-5-chloro-3-indolyl 1-methylvinyl ketone was prepared by substituting 2-phenyl-5-chloro-3-indolyl 1-methyl-2-dipropylaminoethyl ketone propyl iodide for 3-indolyl 2-dimethylaminoethyl ketone methiodide.

EXAMPLE 12

*1-hexyl-6-benzyloxy-3-indolyl 2-butylvinyl ketone*

A. 1-HEXYL-6-BENZYLOXY-3-ACETYLINDOLE

In the same manner as shown in Example 2, part A, 6-benzyloxy-3-acetylindole was prepared utilizing 6-benzyloxyindole in lieu of 5-benzyloxyindole. The resulting 6-benzyloxy-3-acetylindole was reacted with hexyl iodide in the manner disclosed by Baker, supra, to produce 1-hexyl-6-benzyloxy-3-acetylindole.

B. 1-HEXYL-6-BENZYLOXY-3-INDOLYL 2-BUTYL-2-DIPROPYLAMINOETHYL KETONE HYDROCHLORIDE

In the same manner as shown in Example 5, part A, 1-hexyl-6-benzyloxy-3-indolyl 2-butyl-2-dipropylaminoethyl ketone hydrochloride was prepared using 1-hexyl-6-benzyloxy-3-acetylindole, dipropylamine hydrochloride and valeraldehyde in lieu of 1-methyl-3-acetylindole, dimethylamine hydrochloride, and paraformaldehyde.

C. 1-HEXYL-6-BENZYLOXY-3-INDOLYL 2-BUTYLVINYL KETONE

In the same manner as shown in Example 1, part D, 1-hexyl-6-benzyloxy-3-indolyl 2-butylvinyl ketone was prepared by substituting 1-hexyl-6-benzyloxy-3-indolyl 2-butyl-2-dipropylaminoethyl ketone hydrochloride and lithium bicarbonate for 3-indolyl 2-dimethylaminoethyl ketone methiodide and sodium bicarbonate.

Example 13

*1-ethyl-2-phenyl-5-methoxy-3-indolyl 2-methylvinyl ketone*

A. 1-ETHYL-2-PHENYL-5-METHOXY-3-ACETYLINDOLE

In the same manner as shown in Example 2, part A, 2-phenyl-5-methoxy-3-acetylindole was prepared utilizing 2-phenyl-5-methoxyindole (Bull. soc. chim. France, 1950, 551) in lieu of 5-benzyloxyindole. The resulting 2-phenyl-5-methoxy-3-acetylindole was reacted with ethyl iodide in the manner disclosed by Baker, supra, to produce 1-ethyl-2-phenyl-5-methoxy-3-acetylindole.

B. 1-ETHYL-2-PHENYL-5-METHOXY-3-INDOLYL 2-METHYL-2-MORPHOLINOETHYL KETONE HYDROCHLORIDE

In the same manner as shown in Example 5, part A, 1-ethyl-2-phenyl-5-methoxy-3-indolyl 2-methyl-2-morpholinoethyl ketone hydrochloride was prepared using 1-ethyl-2-phenyl-5-methoxy-3-acetylindole, morpholine hydrochloride and acetaldehyde in lieu of 1-methyl-3-acetylindole, dimethylamine hydrochloride, and paraformaldehyde.

C. 1-ETHYL-2-PHENYL-5-METHOXY-3-INDOLYL 2-METHYLVINYL KETONE

In the same manner as shown in Example 1, part D, 1-ethyl-2-phenyl-5-methoxy-3-indolyl 2-methylvinyl ketone was prepared by substituting 1-ethyl-2-phenyl-5-methoxy-3-indolyl 2-methyl-2-morpholinoethyl ketone hydrochloride and potassium propionate for 3-indolyl 2-dimethylaminoethyl ketone methiodide and sodium bicarbonate.

Example 14

*3-indolyl 2-isopropylvinyl ketone*

A. 3-INDOLYL 2-ISOPROPYL-2-DIMETHYLAMINOETHYL KETONE FREE BASE

In the same manner as shown in Example 1, part A, 3-indolyl 2-isopropyl-2-dimethylaminoethyl ketone free base was prepared by substituting isobutyraldehyde for paraformaldehyde.

B. 3-INDOLYL 2-ISOPROPYL-2-DIMETHYLAMINOETHYL KETONE BENZYL CHLORIDE

In the same manner as shown in Example 1, part C, 3-indolyl 2-isopropyl-2-dimethylaminoethyl ketone benzyl chloride was prepared by substituting 3-indolyl 2-isopropyl-2-dimethylaminoethyl ketone free base and benzyl chloride for 3-indolyl 2-dimethylaminoethyl ketone and methyl iodide.

C. 3-INDOLYL 2-ISOPROPYLVINYL KETONE

In the same manner as shown in Example 1, part D, 3-indolyl 2-isopropylvinyl ketone was prepared by substituting 3-indolyl 2-isopropyl-2-dimethylaminoethyl ketone benzyl chloride and potassium acetate for 3-indolyl 2-dimethylaminoethyl ketone methiodide and sodium bicarbonate.

Example 15

*5-(para-methylbenzyloxy)-3-indolyl 1-butylvinyl ketone*

A. 5-(PARA-METHYLBENZYLOXY)-3-CAPROYLINDOLE

In the same manner as shown in Example 2, part A, 5-(para-methylbenzyloxy)-3-caproylindole was prepared by substituting 5-(para-methylbenxyloxy)-indole and caproyl chloride for 5-benzyloxyindole and acetyl chloride.

B. 1-PIPERIDINOMETHYL-5-(PARA-METHYLBENZYLOXY)-3-INDOLYL 1-BUTYL-2-PIPERIDINOETHYL KETONE FREE BASE

In the same manner as shown in Example 3, part A, 1-piperidinomethyl-5-(para-methylbenzyloxy)-3-indolyl 1-butyl-2-piperidinoethyl ketone free base was prepared by substituting 5-(para-methylbenzyloxy)-3-caproylindole and piperidine hydrochloride for 3-propionylindole and dimethylamine hydrochloride.

C. 5-(PARA-METHYLBENZYLOXY)-3-INDOLYL 1-BUTYL-2-PIPERIDINOETHYL KETONE FREE BASE

In the same manner as shown in Example 3, part B, 5-(para-methylbenzyloxy)-3-indolyl 1-butyl-2-piperidinoethyl ketone free base was prepared by hydrolyzing 1-piperidinomethyl-5-(para-methylbenzyloxy)-3-indolyl 1-butyl-2-piperidinoethyl ketone free base in lieu of 1-dimethylaminomethyl-3-indolyl 1-methyl-2-dimethylaminoethyl ketone free base.

D. 5-(PARA-METHYLBENZYLOXY)-3-INDOLYL 1-BUTYL-2-PIPERIDINOETHYL KETONE ETHIODIDE

In the same manner as shown in Example 1, part C, 5-(para-methylbenzyloxy)-3-indolyl 1-butyl-2-piperidinoethyl ketone ethiodide was prepared by substituting 5-(para-methylbenzyloxy)-3-indolyl 1-butyl-2-piperidinoethyl ketone free base and ethyl iodide for 3-indolyl 2-dimethylaminoethyl ketone free base and methyl iodide.

E. 5-(PARA-METHYLBENZYLOXY)-3-INDOLYL 1-BUTYLVINYL KETONE

In the same manner as shown in Example 1, part D, 5-(para-methylbenzyloxy)-3-indolyl 1-butylvinyl ketone was prepared by substituting 5-(para-methylbenzyloxy)-3-indolyl 1-butyl-2-piperidinoethyl ketone ethiodide for 3-indolyl 2-dimethylaminoethyl ketone methiodide.

In the same manner other 3-indolyl vinyl ketones having the general Formula I can be prepared, such as 1-methyl-6-ethoxy-3-indolyl 1,2-dimethylvinyl ketone, 2-butyl-5-benzyloxy-3-indolyl 2-ethylvinyl ketone, 6-(para-chlorobenzyloxy)-3-indolyl 2-propylvinyl ketone, 2-butyl-5-bromo-3-indolyl vinyl ketone, 1-amyl-3-indolyl 1-methylvinyl ketone, 2-propyl-5-propoxy-3-indolyl 1-ethylvinyl ketone, 2-ethyl-5-(para-methylbenzyloxy)-3-indolyl 2-ethylvinyl ketone, by reacting 1-methyl-6-ethoxy-3-indolyl 1,2-dimethyl-2-dipropylaminoethyl ketone propyl iodide, 2-butyl-5-benzyloxy-3-indolyl 2-ethyl-2-piperidinoethyl ketone methiodide, 6-(para-chlorobenzyloxy)-3-indolyl 2-propyl-2-diethylaminoethyl ketone benzyl chloride, 2-butyl-5-bromo-3-indolyl 2-dibutylaminoethyl hydrochloride, 1-amyl-3-indolyl 1-methyl-2-morpholinoethyl ketone acetate, 2-propyl-5-propoxy-3-indolyl 1-ethyl-2-diethylaminoethyl ketone methiodide, 2-ethyl-5-(para-methylbenzyloxy)-3-indolyl 2-ethyl-2-dimethylaminoethyl ketone sulfate, respectively, with an alkali-metal salt of the kind exemplified above.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 3-indolyl vinyl ketones having the formula:

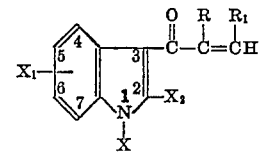

wherein $X_1$ is selected from the group consisting of hydrogen, halogen, benzyloxy, and alkoxy of 1 to 8 carbon atoms, $X_2$ is selected from the group consisting of hydrogen, alkyl of 1 to 8 carbon atoms, aralkyl of 7 to 13 carbon atoms, and aryl of 6 to 10 carbon atoms, X is selected from the group consisting of hydrogen and lower-alkyl of 1 to 6 carbon atoms, inclusive, and R and $R_1$ are selected from the group consisting of hydrogen and lower-alkyl of 1 to 4 carbon atoms, inclusive.

2. 3-indolyl vinyl ketone having the formula:

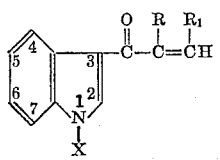

wherein X is lower-alkyl of 1 to 6 carbons atoms, inclusive, and R and $R_1$ are lower-alkyl of 1 to 4 carbon atoms, inclusive.

3. 3-indolyl vinyl ketone having the formula:

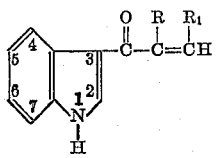

wherein R and $R_1$ are lower-alkyl of 1 to 4 carbon atoms, inclusive.

4. 3-indolyl vinyl ketone.

5. A process for the preparation of 3-indolyl vinyl ketones having the formula:

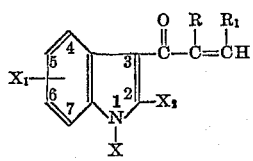

wherein $X_1$ is selected from the group consisting of hydrogen, halogen, benzyloxy, and alkoxy of 1 to 8 carbon atoms, $X_2$ is selected from the group consisting of hydrogen, alkyl of 1 to 8 carbon atoms, aralkyl of 7 to 13 carbon atoms, and aryl of 6 to 10 carbon atoms, R and $R_1$ are selected from the group consisting of hydrogen and lower-alkyl of 1 to 4 carbon atoms, inclusive, X is selected from the group consisting of hydrogen and lower-alkyl of 1 to 6 carbon atoms, inclusive, which comprises the step of reacting in an aqueous medium at a temperature between about 50 and about 95° C. a compound selected from the group consisting of a benzyl quaternary ammonium salt, an alkyl quaternary ammonium salt, and an acid addition salt of a 3-indolyl 2-aminoethyl ketone having the formula:

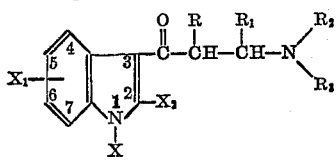

wherein X, $X_1$, $X_2$, R, and $R_1$ have the above values, $R_2$ and $R_3$ are hydrocarbon radicals selected from the group consisting of aryl, aralkyl, lower-alkyl, and cycloalkyl and together contain not more than 16 carbon atoms, and $R_2$ and $R_3$ together with —N< form a heterocyclic amino of 4 to 6 carbon atoms, with a salt selected from the group consisting of alkali-metal carbonates, bicarbonates, thiocyanates, and alkanoates containing 1 to 9 carbon atoms inclusive.

6. A process for the preparation of 3-indolyl vinyl ketones having the formula:

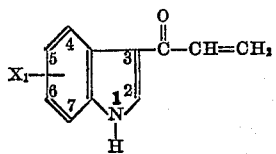

wherein $X_1$ is benzyloxy which comprises the step of reacting in an aqueous medium at a temperature of between about 50 and about 95° C. an alkyl quaternary ammonium salt of a 3-indolyl 2-aminoethyl ketone having the formula:

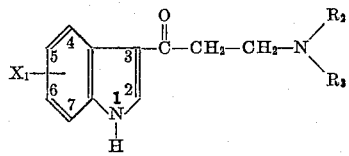

wherein $X_1$ has the above value and $R_2$ and $R_3$ are lower alkyl and together contain not more than 16 carbon atoms, with an alkali-metal carbonate.

7. A process for the preparation of 3-indolyl vinyl ketones having the formula:

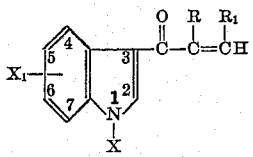

wherein $X_1$ is benzyloxy, X is lower alkyl of 1 to 6 carbon atoms, inclusive, R and $R_1$ are lower alkyl of 1 to 4 carbon atoms, inclusive, which comprises the step of reacting in an aqueous medium at a temperature between about 50 and about 95° C. an alkyl quaternary ammonium salt of a 3-indolyl 2-aminoethyl ketone having the formula:

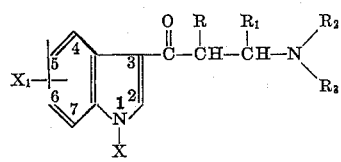

wherein X, $X_1$, R and $R_1$ have the above values and $R_2$ and $R_3$ are lower alkyl and together contain not more than 16 carbon atoms, with an alkali-metal bicarbonate.

8. A process for the preparation of 3-indolyl vinyl ketone having the formula:

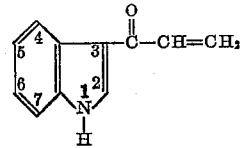

which comprises the step of reacting in an aqueous medium at a temperature between about 50 and about 95° C. an alkyl quaternary ammonium salt of 3-indolyl 2-aminoethyl ketone free base having the formula:

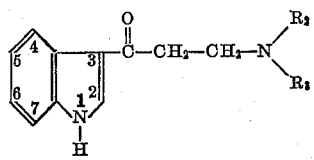

where $R_2$ and $R_3$ are alkyl and together contain not more than 16 carbon atoms, with an alkali-metal bicarbonate.

References Cited in the file of this patent

Randall et al.: Abandoned application abstract, Serial No. 62,242, published Jan. 22, 1952, O.G., vol. 654, pp. 1152–4.

Beilstein: Mainwork, vol. 21 (1935), p. 356.